United States Patent
Hayashi

(10) Patent No.: US 9,332,139 B2
(45) Date of Patent: May 3, 2016

(54) INFORMATION PROCESSING APPARATUS AND METHOD

(71) Applicant: CANON KABUSHIKI KAISHA, Tokyo (JP)

(72) Inventor: Kimio Hayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/292,412

(22) Filed: May 30, 2014

(65) Prior Publication Data

US 2014/0368843 A1    Dec. 18, 2014

(30) Foreign Application Priority Data

Jun. 14, 2013  (JP) ................................. 2013-126131

(51) Int. Cl.
| | | |
|---|---|---|
| *G06F 15/00* | (2006.01) | |
| *H04N 1/00* | (2006.01) | |
| *H04N 1/32* | (2006.01) | |
| *G06F 3/12* | (2006.01) | |

(52) U.S. Cl.
CPC .......... *H04N 1/00196* (2013.01); *G06F 3/1208* (2013.01); *G06F 3/1244* (2013.01); *G06F 3/1285* (2013.01); *H04N 1/32106* (2013.01); *H04N 2201/0082* (2013.01); *H04N 2201/326* (2013.01); *H04N 2201/3221* (2013.01); *H04N 2201/3274* (2013.01)

(58) Field of Classification Search
None
See application file for complete search history.

(56) References Cited

U.S. PATENT DOCUMENTS

| | | | |
|---|---|---|---|
| 6,246,993 B1 * | 6/2001 | Dreyer et al. | 705/7.26 |
| 2005/0243343 A1 * | 11/2005 | Ng | 358/1.9 |
| 2008/0277866 A1 * | 11/2008 | Moriyama et al. | 271/279 |
| 2010/0235755 A1 * | 9/2010 | Wilson | G06F 3/1205 715/744 |
| 2011/0141507 A1 * | 6/2011 | Kawaura | 358/1.13 |
| 2012/0013631 A1 * | 1/2012 | Hughes | 345/589 |
| 2012/0133960 A1 * | 5/2012 | Henderson | H04N 1/6044 358/1.9 |
| 2013/0242351 A1 * | 9/2013 | Seto | G06F 3/1296 358/3.29 |

FOREIGN PATENT DOCUMENTS

JP    2006-243480 A    9/2006

* cited by examiner

*Primary Examiner* — John Wallace
(74) *Attorney, Agent, or Firm* — Fitzpatrick, Cella, Harper & Scinto

(57) ABSTRACT

An information processing apparatus for causing an image forming apparatus to perform printing, the image forming apparatus being able to perform calibration in order to correct an output color to a target color indicated by target information, includes a storing unit configured to, when printing processing is executed for a print job by the image forming apparatus, store the target information in association with the print job.

8 Claims, 14 Drawing Sheets

FIG. 9

ORDER DATA  730

```
<PrintTalk>
 <Request>                                                  731
  <PurchaseOrder BusinessID="12345" RequestDate="2012-12-14">
    <JDF>
      <ResourcePool>
        <CustomerInfo ID="Cus001">
          <Contact ID="Con001">
            <Person FirstName="June" LastName="Jones"/>            732
            <AddressStreet="1745 First Street" City="Dublin" Region="OH" PostalCode="43202"/>
          </Contact>
        </CustomerInfo>
        <DeliveryIntent>
          <Method Preferred="UPS"/>
          <DropIntent>
            <Required Preferred="2012-12-24/>                      733
            <ContactRef rRef="Con001"/>
            <DropItem Intent Amount="1" Unit="500">
              <ComponentRef rRef="Item001"/>
            </DropItem Intent>
          </DropIntent>
        </DeliveryIntent>                                    734
        <Component ID="98765432" DescriptiveName="ProductName"/>
        <JDF DescriptiveName="WraparoundBand">         736
          <GeneralID IDUsage="Option" IDValue="Dynamic"/>
          <!-- JDF subnode -->
        </JDF>
        <JDF DescriptiveName="Body">
          <ResourcePool>                               737
            <ColorantControl ProcessColorModel="DeviceCMYK"/>
            <!-- JDF subnode -->
          </ResourcePool>
        </JDF>                                                   735
        <JDF DescriptiveName="Cover">              739
          <GeneralID IDUsage="Option" IDValue="Dynamic"/>
          <ResourcePool>                           738
            <ColorantControl ProcessColorModel="DeviceGray"/>
            <!-- JDF subnode -->
          </ResourcePool>
        </JDF>
        <JDF DescriptiveName="Jacket">
          <!-- JDF subnode -->
        </JDF>
      </ResourcePool>
    </JDF>
  </PurchaseOrder>
 </Request>
</PrintTalk>
```

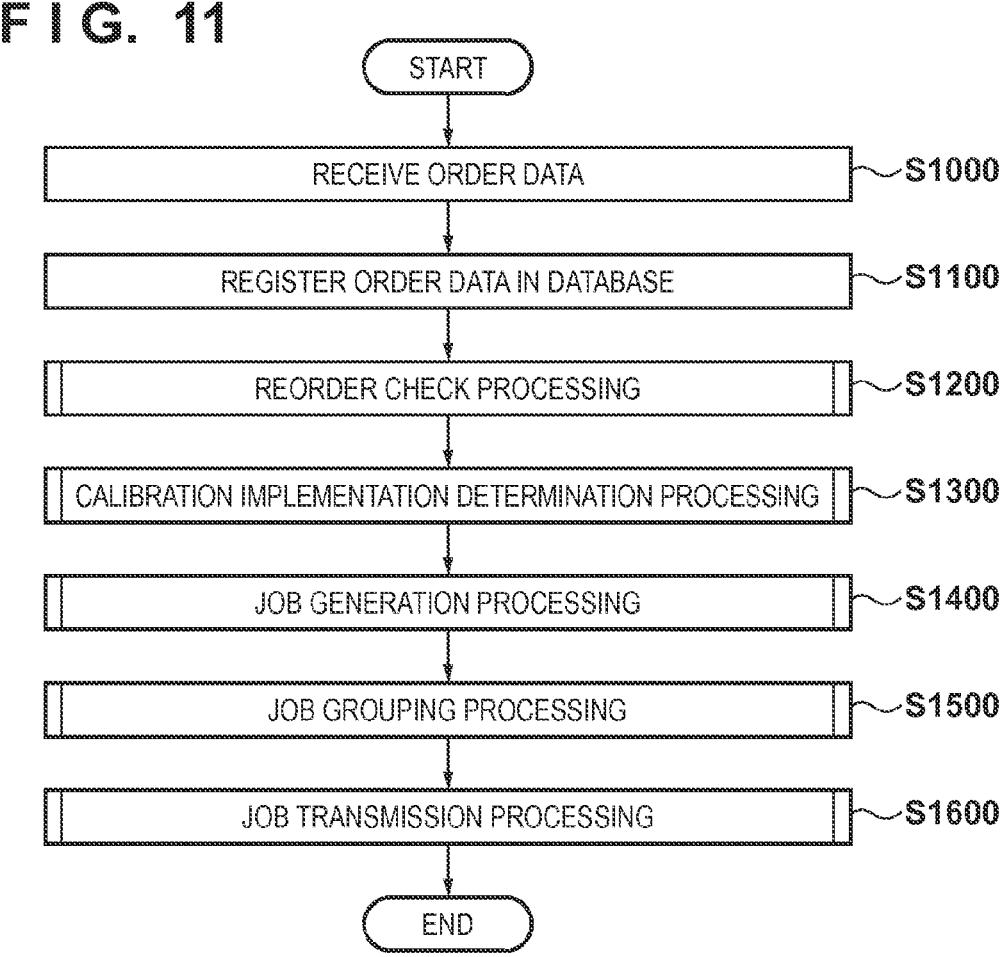

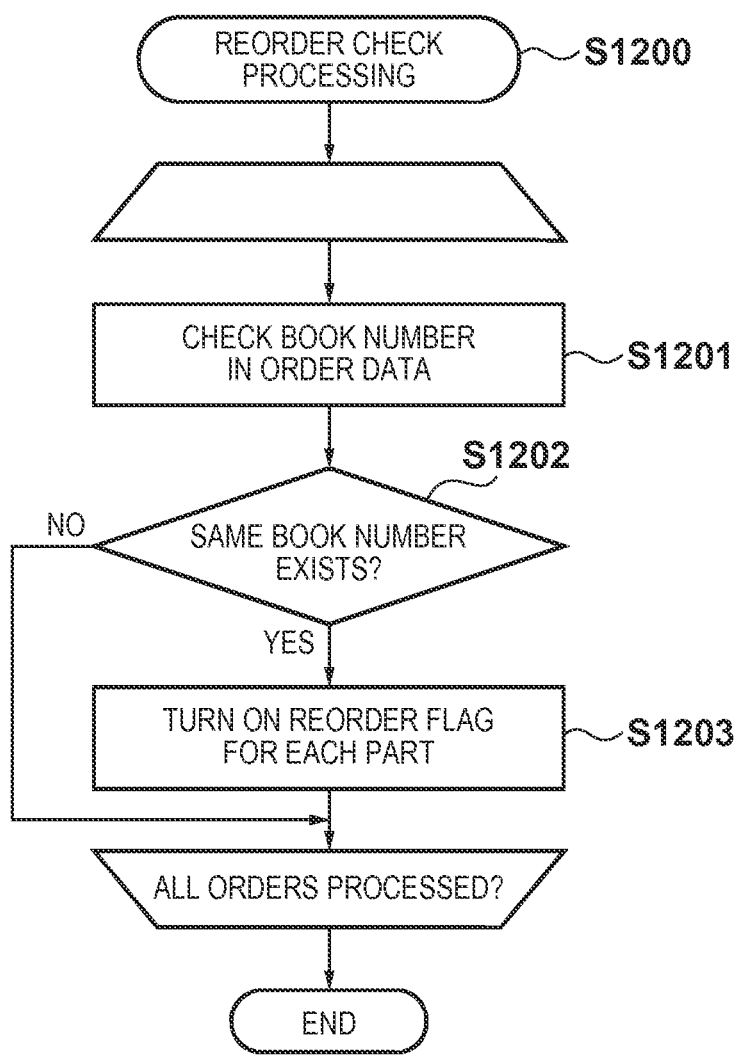

INFORMATION PROCESSING APPARATUS AND METHOD

BACKGROUND OF THE INVENTION

1. Field of the Invention

The present invention relates to an information processing apparatus and method for realizing optimization, or the like, of a calibration operation in on-demand printing, for example.

2. Description of the Related Art

In recent years, on-demand printing has been increasingly popular at production sites, resulting from an improvement of printing technology due to digitalization in image forming apparatuses, color management technology for controlling image forming apparatuses, order acceptance via the Internet, automation of pagination, and the like. Characteristics of on-demand printing lie in that a very small lot can be handled, the delivery time is short, and there is a wide variety of product lineup and options in order to meet demand of each customer.

To prevent degradation of tone caused by long-time printing or aged deterioration of an image forming apparatus, it is necessary to regularly calibrate the printer, whereas there is a demand for optimizing a calibration operation at production sites of on-demand printing, which has the aforementioned characteristics. This is because, in on-demand printing, various types of items in a very small lot are produced in a short delivery time, and therefore the production sites cannot take much time to execute calibration. If too much time and effort are taken to execute calibration, it will affect the production plan based on the premise of a short delivery time.

There is a technique for optimizing execution of calibration by measuring the density of a patch between sheets if the number of printed sheets after implementing calibration reaches a threshold value, and giving an instruction to implement calibration if the measurement result is smaller than a predetermined threshold value (see Japanese Patent Laid-Open No. 2006-243480.

Japanese Patent Laid-Open No. 2006-243480 discloses that the density of a patch between sheets is measured if the number of printed sheets reaches a prescribed number, and an instruction to implement tone correction in accordance with the measurement result is given. However, for example, in the case where the same tone needs to be applied to parts, such as a cover and a wraparound band, of an item, such as a photobook, a photo album, or a manual, that is constituted by a plurality of parts including a cover, main text, a wraparound band, and the like, calibration needs to be performed for each part regardless of the number of sheets to be printed, and it is difficult, with the technique recited in Japanese Patent Laid-Open No. 2006-243480, to reduce the frequency of calibration.

For example, a photobook is one of the items with many parts that is produced in on-demand printing. A photobook is constituted by four parts, namely a wraparound band, main text, a cover, and a jacket. Different types of paper are used for the respective parts. At production sites of photobooks, printing is performed for each part in order to save time and effort to switch paper.

In the case of printing the same image on the cover and the wraparound band of a photobook, the tones of printed colors on the cover and the wraparound band are expected to be the same. However, if printing is performed for each part at a production site in order to save time and effort to switch paper as mentioned above, that is to say, if initially the cover is solely printed and the wraparound band is printed thereafter, the tones of printed colors on the cover, which is printed first, and the wraparound band, which is printed next, are possibly different. Accordingly, to apply the same tone to the image printed on the cover and the image printed on the wraparound band, a target used in calibration that has been performed before the execution of printing on the cover prior to starting printing on the wraparound band needs to be selected from a panel to implement calibration.

Moreover, the time and effort for calibration cannot be reduced even in the case where the same item is reordered. In the case of a reorder, there is a demand, at production sites, for printing copies for the reorder with the same tone as the tone used for the previous order. For example, if a customer purchases one copy of a photobook on a trial basis and then orders the same photobook once again since he/she likes the trial copy he/she ordered, the copy for the reorder needs to be produced with the same tone as the tone used in the trial copy. In this case, if it is attempted to apply the same tone as the tone for the previous order to printing for the reorder, production needs to be stopped for each part for the reorder before printing is performed, in order to select the previous target from the panel to perform calibration. Accordingly, calibration for each part is still necessary, and it is difficult to reduce the frequency of calibration. Since calibration in the middle of printing decreases the efficiency in production of an item, the production efficiency is lower as the frequency thereof is higher.

The present invention has been made in view of the above-described conventional example, and provides an information processing apparatus and method with which an increase in the frequency of calibration is prevented. In particular, the present invention provides an information processing apparatus and method with which an increase in the frequency of calibration is prevented in the case where the same tone needs to be applied to colors printed on different types of paper.

SUMMARY OF THE INVENTION

The feature of an information processing apparatus according to the present invention lies in the following configuration. An information processing apparatus for causing an image forming apparatus to perform printing, the image forming apparatus being able to perform calibration in order to correct an output color to a target color indicated by target information, includes: a storing unit configured to, when printing processing is executed for a print job by the image forming apparatus, store the target information in association with the print job.

According to the present invention, the number of times to implement calibration can be reduced. Furthermore, since the number of times to implement calibration is reduced, the productivity in a printing operation increases, and the time taken to obtain a printing result can be shortened.

Further features of the present invention will become apparent from the following description of exemplary embodiments (with reference to the attached drawings).

BRIEF DESCRIPTION OF THE DRAWINGS

FIG. 9 is a diagram showing exemplary order data according to the present embodiment.

FIG. 10 is a diagram showing an exemplary job according to the present embodiment.

FIG. 11 is a diagram showing a basic processing flow according to the present embodiment.

FIG. 12 is a diagram showing a flow of reorder check processing according to the present embodiment.

DESCRIPTION OF THE EMBODIMENTS

First Embodiment

Hereinafter, a mode for carrying out the present invention will be described using the drawings.

Relationship Between Order, Item, Parts, and Jobs

Figure 1:
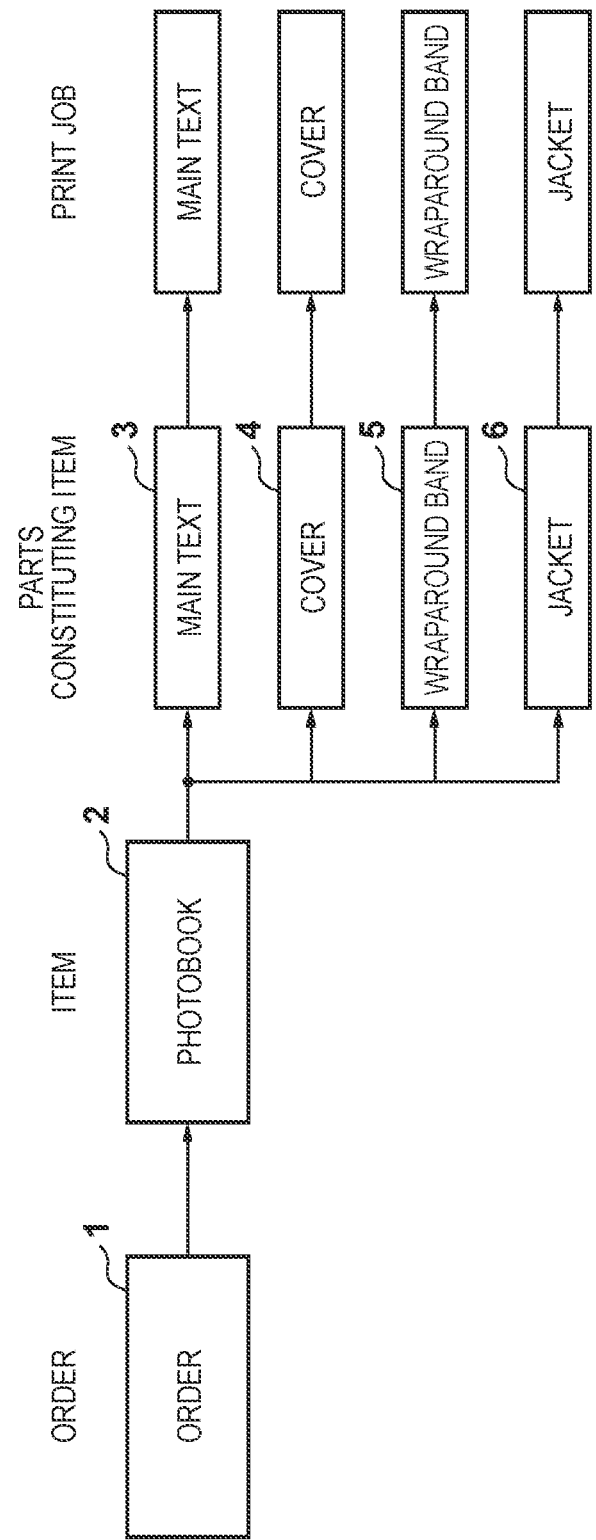
FIG. 1 is a diagram showing a relationship between an order, an item, and parts according to the present embodiment.

FIG. 1 is a block diagram showing a relationship between an order, an item, parts, and jobs in the present embodiment. An order 1 is constituted by one or more items. In the present embodiment, a photobook 2 is assumed to be ordered. The photobook 2 is constituted by a plurality of parts. In the present embodiment, the photobook 2 is constituted by parts that are main text 3, a cover 4, a wraparound band 5, and a jacket 6. Content of each part is input as a single PDF file, in which an image is arranged. A single print job is created for each part by an information processing system in the present embodiment. For example, the order 1 need only be information (order information) specifying the fact that the order 1 is an order, and also specifying the item, which is an object of the order. The information specifying the item includes, for example, specification of content of the item including designation of an image, a layout, and the like, specification of constituent parts, specification of the quantity, and the like. With the order information contained in the order 1, the item 2, or the photobook in the example in FIG. 1 can be specified, and the constituent parts can also be specified. In the example in FIG. 1, the constituent parts are the main text 3, the cover 4, the wraparound band 5, and the jacket 6, in accordance with the content of the order 1. Of course the image to be printed on these constituent parts is specified by the order 1.

Exemplary Case where Cover and Wraparound Band are Connected

Figure 2:
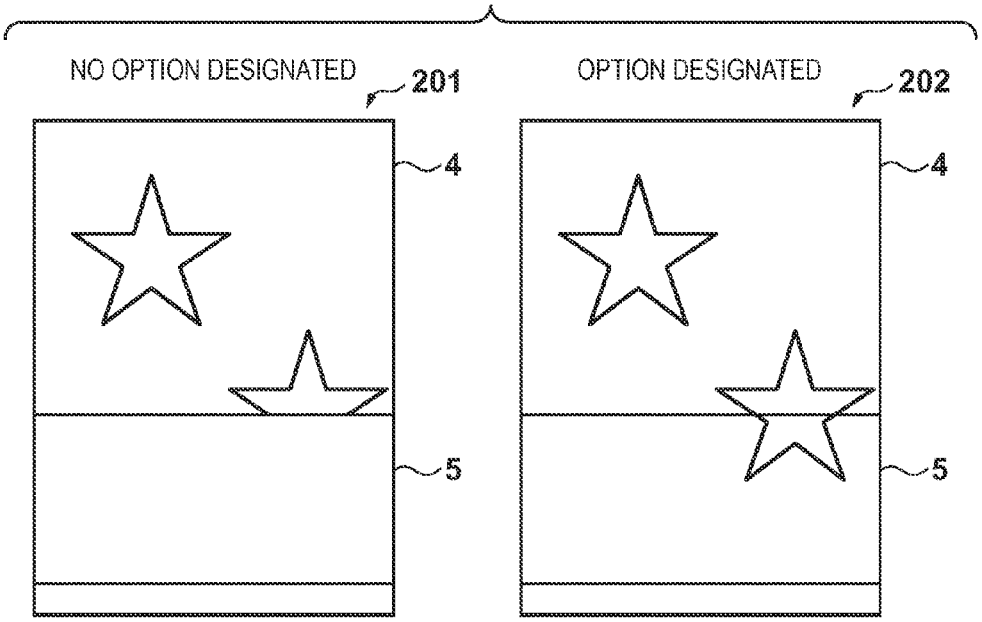
FIG. 2 is a diagram showing an example in which a cover and a wraparound band according to the present embodiment are connected with each other.

FIG. 2 is a block diagram showing an exemplary case where the cover and the wraparound band are connected with each other in accordance with an option designated by a customer. The connection mentioned here indicates that an image is printed on the entire cover, and the same image as, or a part of, the image printed on the cover is also printed on the wraparound band. Since the same image is printed on the cover and the wraparound band, the images are required to be printed with the same tone. If the option is not designated, the image printed on the cover 4 is not printed on the wraparound band 5 (a printing result 201). If the option is designated, the image printed on the cover 4 is also printed on the wraparound band 5 (a printing result 202). If the option is designated, it is preferable that the same colors are applied to the cover 4 and the wraparound band 5, as mentioned above. Here, as shown in FIG. 2, the size of the cover 4 and the wraparound band 5 is different, and the paper quality thereof is also different in some cases. In any case, printing is performed on different types of paper.

Network Configuration

Figure 3:
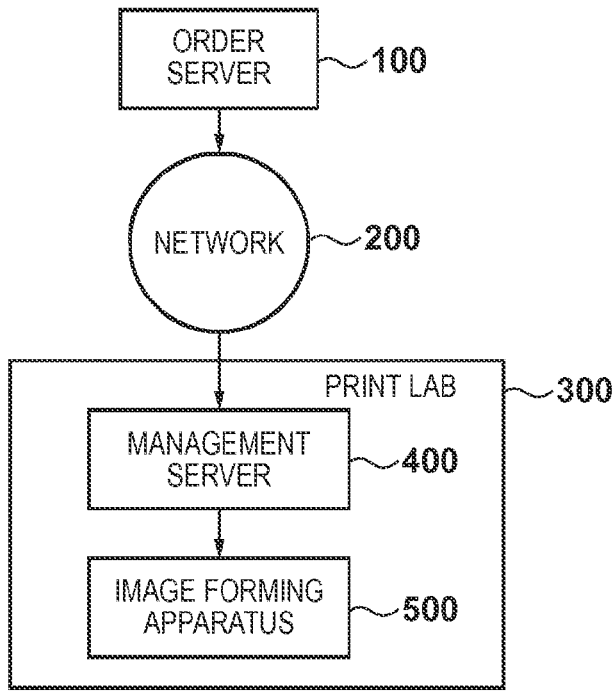
FIG. 3 is a diagram showing a network configuration of an information processing system according to the present embodiment.

FIG. 3 is a diagram showing a network configuration of the information processing system in Embodiment 1. As shown in FIG. 3, the network configuration of the information processing system according to the present embodiment is generally constituted by a network system including an order server 100 and a print lab 300 that are connected to each other by a network 200 such as a WAN.

The order server 100 is a server computer functioning as a document input system for inputting document data via the Web. For example, in the case of purchasing the photobook 2 via the Web, the customer starts a Web browser at home and accesses a website provided by the order server 100. The customer uploads pictures to the order server 100 and pays the presented amount to order the photobook 2. The order information specifying this order is the order 1.

The print lab 300 is an image forming system including a management server 400 and an image forming apparatus 500. The management server 400 is a computer that receives the order 1 issued by the order server 100, stores and manages the received order information, and generates a workflow describing processes for producing the item in accordance with the order information. The management server 400 functions as an information processing apparatus for managing printing performed by the image forming apparatus 500. The image forming apparatus 500 is connected to the management server 400 by means of communication, executes a printing process, i.e., a print job, among processes in the workflow issued by the management server 400, and performs printing on constituent parts of a printed matter, which is the item. The print lab 300 includes post-print processing apparatuses, such as a cutting apparatus and a bookbinding apparatus, as well as the image forming apparatus 500, in order to perform cutting and bookbinding as necessary. The post-print processing apparatuses are connected to a LAN in some cases, or not connected thereto in other cases. Jobs for these kinds of post-print processing are also issued as processes constituting the workflow, and the post-print processing apparatuses perform processing by executing the respective jobs.

Configuration of Management Server

Figure 4:
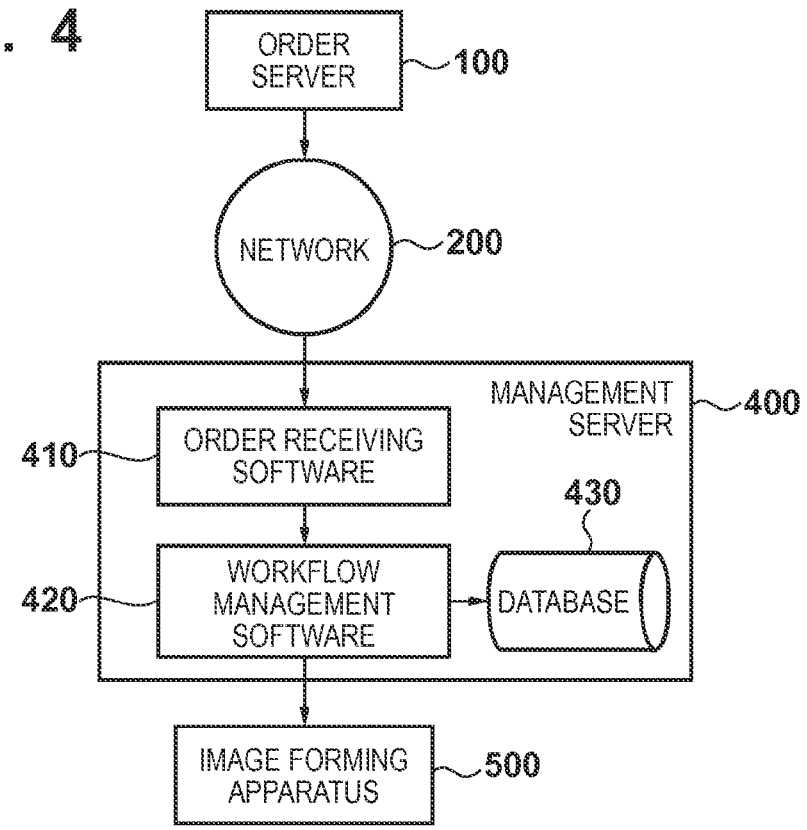
FIG. 4 is a diagram showing a configuration of a management server according to the present embodiment.

FIG. 4 is a block diagram showing a configuration of the management server 400 in Embodiment 1. Order receiving software 410 for receiving the order information from the order server 100 via the network 200 and workflow management software 420 for managing the received order information and issuing a job related to the received order to the image forming apparatus 500 are installed in an executable manner in the management server 400, and the management server 400 has a database 430 for storing the received order information, content data, and the like. Note that in the present embodiment, "software" and "a program" have the same meaning.

The workflow management software 420, upon receiving the order information from the order receiving software 410, performs prepress processing, job creation processing, and job-issuing processing for each part of an item, i.e., a printed matter described in the order. As the prepress processing, image correction processing is performed on an image arranged in content data of the parts of the photobook. Furthermore, PDF layout processing is performed for adding a crop mark used in a cutting process and a barcode for item inspection to the content data of the parts of the photobook. After the prepress processing, the workflow management software 420 creates jobs for the respective parts and issues the created jobs to the image forming apparatus 500.

Figure 5:
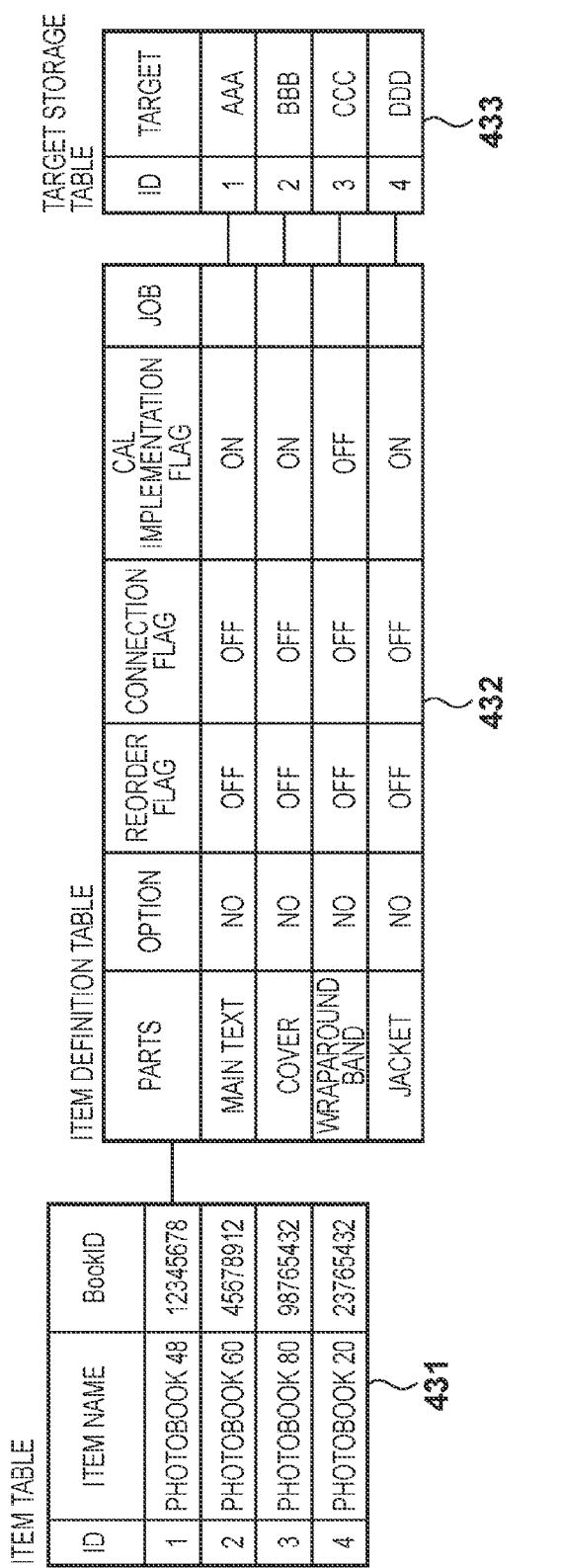
FIG. 5 is a diagram showing a configuration of a database according to the present embodiment.

The database 430 in Embodiment 1 is constituted by an item table 431, an item definition table 432, and a target storage table 433, as shown in FIG. 5. A single item for which an order has been received is stored in a single record in the item table 431. Each record in the item table 431 includes fields of the item ID, the item name, and BookID that are unique to each item. Each record in the item table 431 is associated with the item definition table 432. The item definition table 432 includes parts records in which parts constituting each item stored in the item table 431 are defined, and each parts record stores fields of an option setting designated by the customer when placing an order, a reorder flag indicating whether the order is a first-time order or a reorder, a connection flag indicating whether or not the wraparound band and the cover are connected as shown in FIG. 2, a calibration (CAL) implementation flag indicating the necessity for color calibration before printing is performed on the part, i.e., before printing processing is executed, a job for each part, and the like. The target storage table 433 stores targets obtained from the image forming apparatus 500. A target is data of digitalized samples of target colors serving as a target of colors to be output by the image forming apparatus, and each record, i.e., each target in the target storage table 433 is associated with a job stored in the item definition table 432.

A value necessary for adjusting output colors to the target is used as a correction value, and when an image is output, a shift of a color value caused by changes in the image forming apparatus over time, or the like, can be corrected by outputting the image using this correction value. That is to say, the value of the colors to be output from the image forming apparatus can be corrected to the value of the colors at the time when the target is stored, by thus performing correction.

Figure 16:
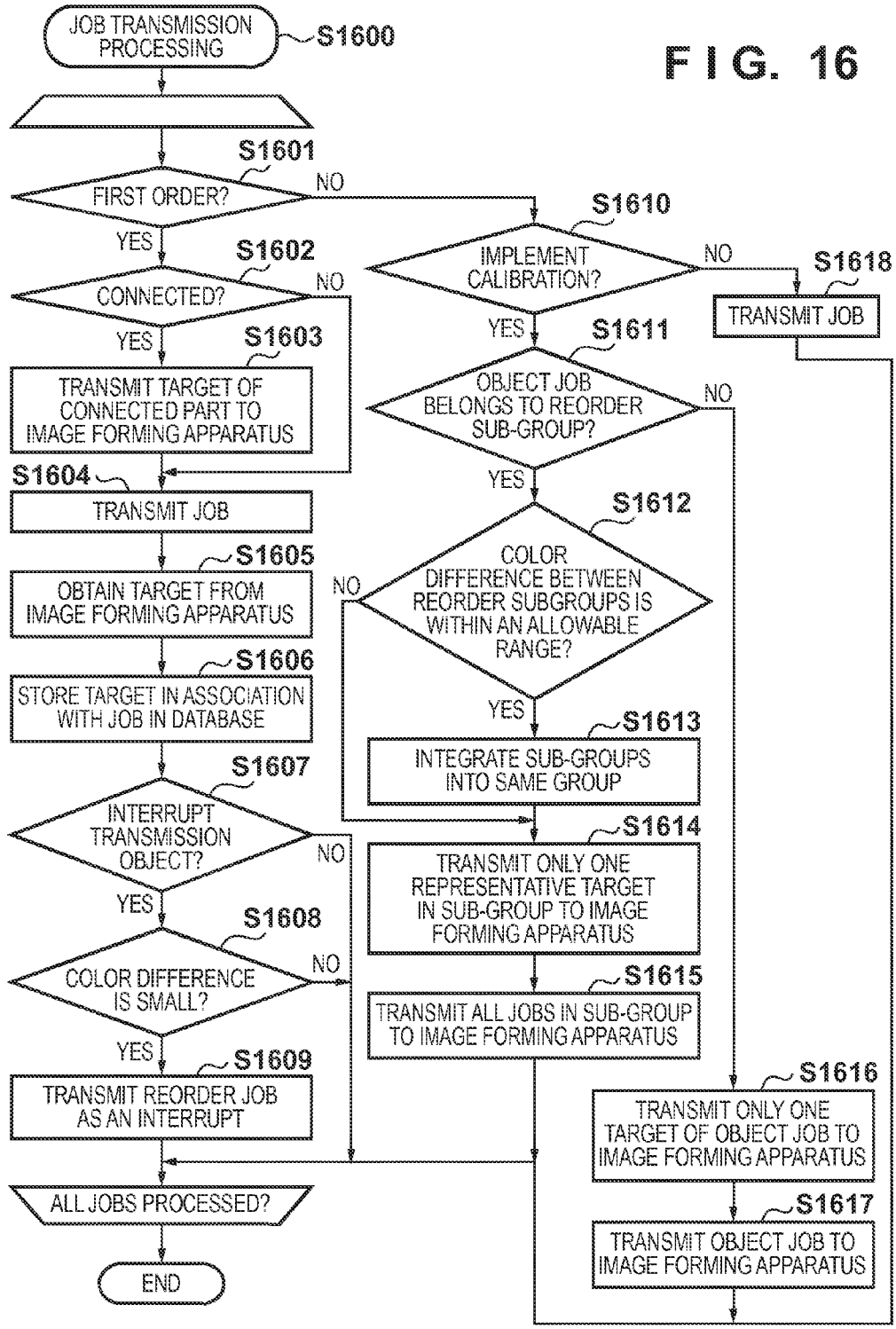
FIG. 16 is a diagram showing a flow of job transmission processing according to the present embodiment.

The target may be created by storing a value of colors at the time when samples are output at an arbitrary timing, for example. Furthermore, the target is a set of density data used for outputting a plurality of target colors that are determined at intervals of predetermined density levels, for example. For example, in the case of using, as the image forming apparatus 500, a color printer in which 256 gradation levels of each of four colors, namely YMCK, are available, an exemplary target is a set of 64-color samples obtained by generally selecting every 16 gradation levels of each color component and combining these 16 gradation levels of four color components. In this case, the target is, for example, data that associates YMCK values for printing the samples with a standard apparatus with colorimetric values serving as the target obtained by measuring colorimetric values of a color patch printed using this YMCK values, and organizes such association for all samples. Note that in the present embodiment, the target is created by the image forming apparatus 500 that performs printing processing, as shown in FIG. 16. That is to say, a patch of sample colors is printed by the image forming apparatus 500, and the target is created by associating color values of the samples and the measured colorimetric values of the patch. This creation is performed by executing a calibration program (not shown). Accordingly, although the target in the present embodiment is simply referred to as the "target", it may alternatively be referred to as "target information".

In the calibration, the samples in the target are printed by the image forming apparatus subjected to the calibration, the colorimetric values of the printed sample image are measured, and a calibration table is created so as to correct the YMCK values of the samples such that the measured colorimetric values of the printed samples are the colorimetric values contained in the target. The created calibration table is transmitted to the image forming apparatus 500, and color correction is performed by the image forming apparatus 500.

Hardware Configuration of Management Server

Figure 6:
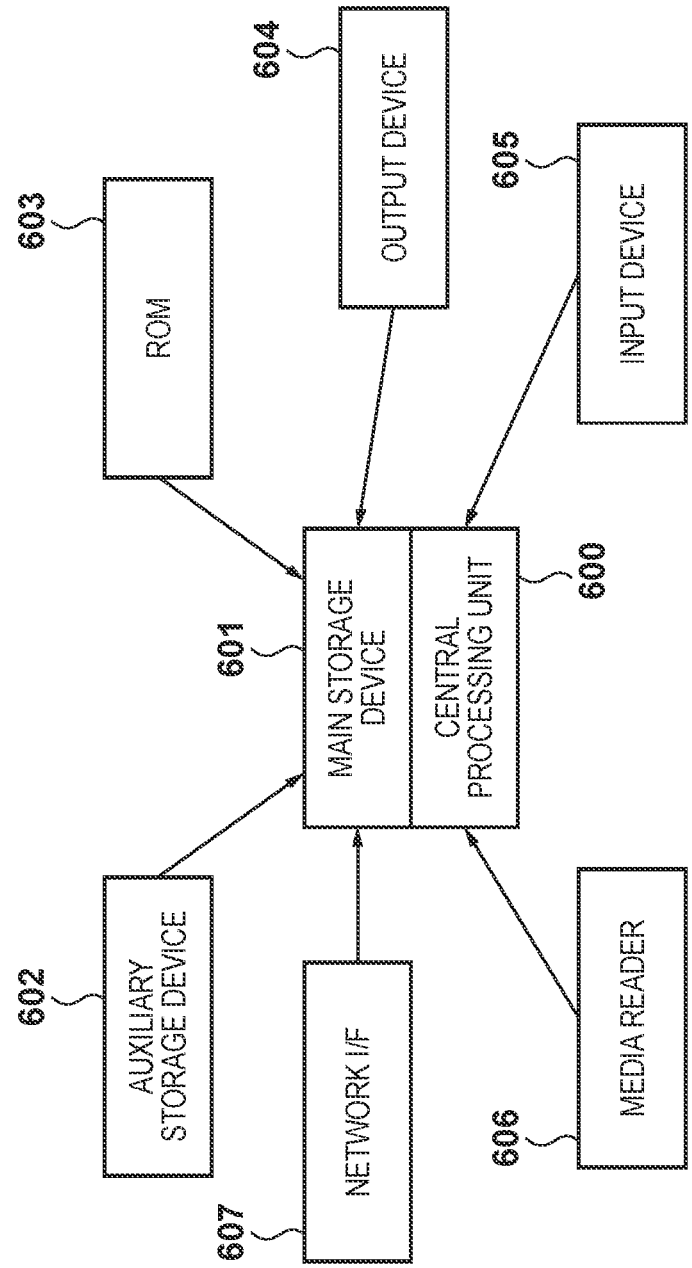
FIG. 6 is a diagram showing a hardware configuration of a management server according to the present embodiment.

FIG. 6 is a block diagram showing a hardware configuration of the management server 400 in Embodiment 1. In FIG. 6, a central processing unit 600 reads a program such as the order receiving software 410 or the workflow management software 420, as well as related data, from a recording medium that stores the program and related data, such as a Floppy disk, a CD-ROM, or an IC memory card, via a media reader 606 connected to the system, or receives the program and related data via the network 200, and stores them in an auxiliary storage device 602 such as a hard disk. Thereafter, the central processing unit 600 executes an application program loaded from the auxiliary storage device 602 onto a main storage device 601, processes information that is input from an input device 605, and outputs the processed information to the image forming apparatus 500 via an output device 604 or a network I/F 607. Note that in the present embodiment, the output device 604 is a display device such as a display, and is distinguished from the image forming apparatus 500, which originally is included in output devices. It is assumed that the input device 605 is constituted by a keyboard, a pointing device, or the like. Note that the procedures shown in later-described flowcharts are stored in any of the main storage device 601, the auxiliary storage device 602, and a ROM 603 in the management server 400, and are executed by the central processing unit 600, usually after being copied into the main storage device 601.

Furthermore, the auxiliary storage device 602 may be constituted by a hard disk or an MO disk, or may be constituted by a combination thereof. Even if the above devices are connected to one another via a network, it does not limit the present invention.

Configuration of Workflow Management Software

Figure 7:
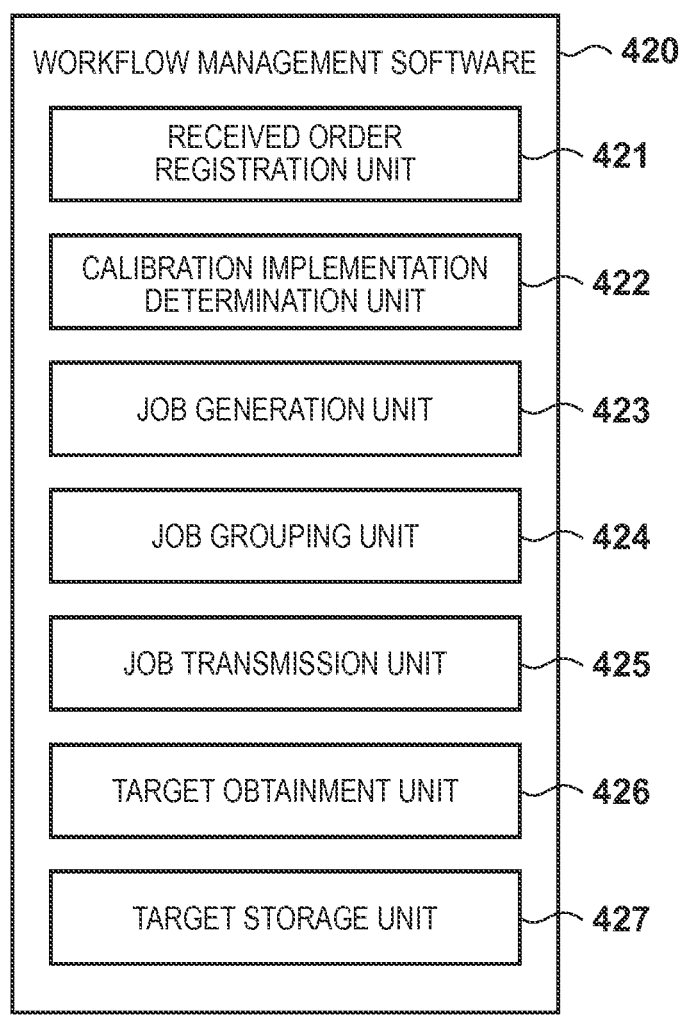
FIG. 7 is a diagram showing a module configuration of workflow management software according to the present embodiment.

FIG. 7 is a diagram illustrating the workflow management software 420 in an embodiment of the present invention. FIG. 7 is a diagram showing features of processing in the present embodiment.

In FIG. 7, the workflow management software 420 includes a received order registration unit 421, a calibration implementation determination unit 422, a job generation unit 423, a job grouping unit 424, a job transmission unit 425, a target obtainment unit 426, and a target storage unit 427. Each unit represents a functional block realized by the central processing unit 600 executing the workflow management software 420, and can also be considered to be means for realizing the corresponding function.

The received order registration unit 421, upon receiving the order information from the order receiving software 410, adds a record to the item table 431 in the database 430, based on the item quantity described in the order information. Next, the received order registration unit 421 writes the item number and the item name described in the order data, in the created record in the item table 431. Furthermore, the received order registration unit 421 writes designation of the option designated for the parts of the item by the customer, in the item definition table 432.

The calibration implementation determination unit 422 determines whether or not to implement calibration for each part constituting the item. The calibration implementation determination unit 422 writes the determination result using the calibration implementation flag in each parts record in the item definition table 432 in the database 430.

The job generation unit 423 generates a job for each part, and associates the generated job with the target necessary for implementing calibration.

The job grouping unit 424 performs determination regarding conditions, e.g., determines whether or not the order is a reorder, and further groups jobs, based on the targets associated with the jobs.

The job transmission unit 425 transmits the job created by the job generation unit 423 to the image forming apparatus 500. At the time of transmission, the job transmission unit 425 switches the transmission method in accordance with a grouping setting determined by the job grouping unit 424. Furthermore, the job transmission unit 425 switches between transmission of a job involving calibration and transmission of a job not involving calibration, in accordance with the result of determination by the calibration implementation determination unit 422.

After the transmitted job is printed by the image forming apparatus 500, the target obtainment acquisition unit 426 obtains the target held by the image forming apparatus 500, via the network I/F 607.

The target storage unit 427 stores, in the database 430, the target obtained by the target obtainment unit 426 in association with the job.

Exemplary Order Information

Figure 8:
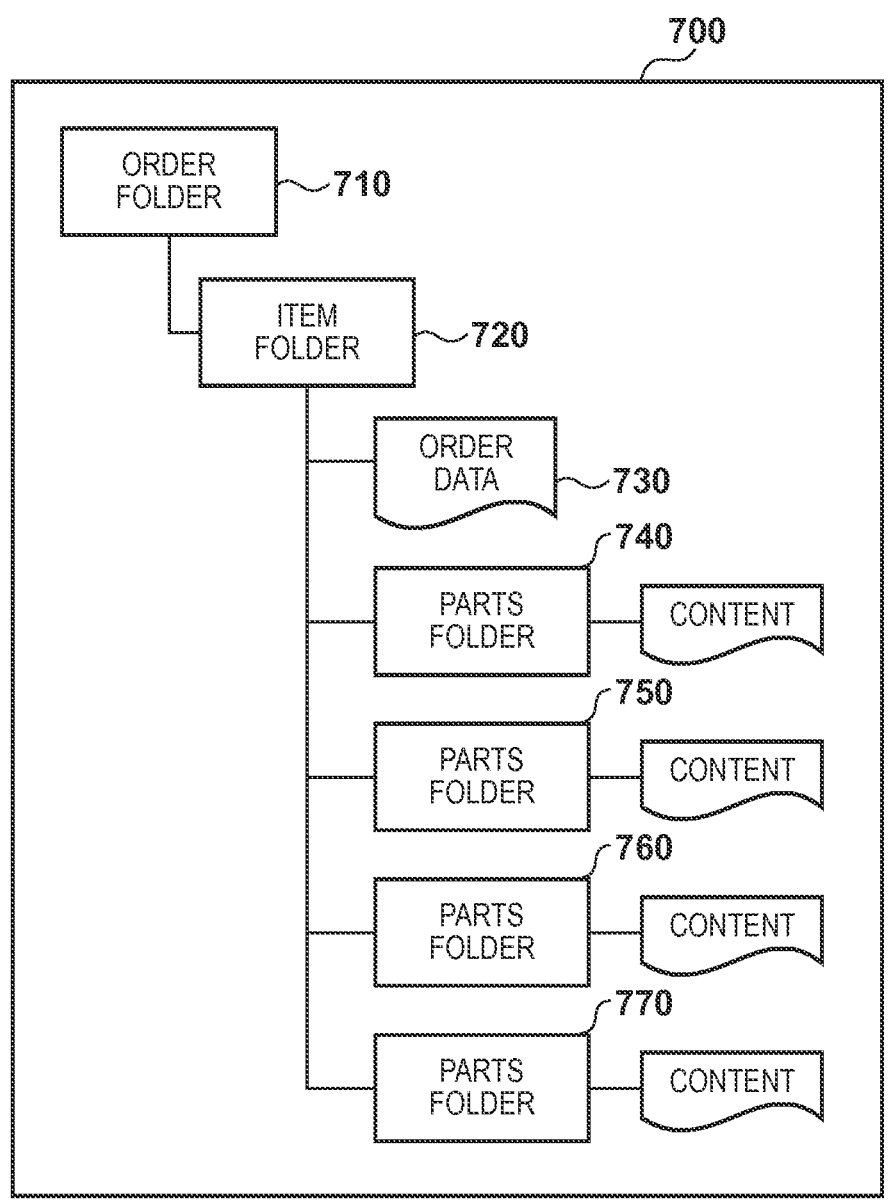
FIG. 8 is a diagram showing an exemplary order according to the present embodiment.

FIG. 8 shows exemplary order information in Embodiment 1. In Embodiment 1, order information 700 transmitted from the order server 100 has a folder configuration shown in FIG. 8. An order folder 710 is at an uppermost layer, and an item folder 720 is immediately below the order folder 710. Immediately below the item folder 720 are order data 730 in which an option setting, a parts configuration, an orderer, a delivery address, and the like, for the item are described, and parts folders 740 to 770 storing content of the respective parts. Note that when referring to the order information and the order data in the description of the present embodiment, the order information is intended to include the content and is distinguished from the order data that is intended to exclude the content.

Exemplary Order Data

FIG. 9 shows exemplary order data 730 in Embodiment 1. In the present embodiment, the order data is expressed in the format of CIP4's PrintTalk. The PrintTalk format, which is based on XML, is a standard format for exchanging transaction data, and uses JDF to express specifications of printed matters. The PrintTalk format data is roughly divided into a header element, a request element, and a JDF element, and the request element and the JDF element respectively correspond to order particular information and information of specification of a printed matter, which is the item.

In FIG. 9, the order data 730 includes order particular information 731 in which the order number and the order date are described. The order particular information 731 includes orderer information 732, a delivery method 733, item information 734 in which the item number and the item name are described, and parts information 735. An option tag 736 is an option that is set for a part "wraparound band". In the present embodiment, if "Dynamic" is designated as the option, it means that parts for which "Dynamic" is designated are connected with each other. Since "Dynamic" is designated as the option for the wraparound band and the cover ("Cover") as indicated by option tags 736 and 739 in the order data 730, the wraparound band and the cover are connected, and the printing result thereof is the printing result 202 in FIG. 2. With this order data 730, the fields in the database in FIG. 5 excluding the "job" field in the item definition table 432 and the target storage table 433 can be filled out.

Exemplary Job

FIG. 10 shows an exemplary job generated by the job generation unit 423 in Embodiment 1. A job 800 is described using JDF, and is also called a "job ticket". The job 800 is constituted mainly by three blocks. The first block is an association section 801 representing information of association between the job and the target. The second block is a print setting section 802 describing a print setting of the job. The third block is a process association section 803 describing the process in which the print setting section 802 is used.

Basic Flow

FIG. 11 shows a basic flow in the present embodiment that is processed by the group of modules 421 to 427 constituting the workflow management software 420.

Initially, in step S1000, the received order registration unit 421 receives the order information from the order receiving software 410. Next, in step S1100, the received order registration unit 421 adds a record to the item table 431 in the database 430, based on the item quantity described in the order information. The received order registration unit 421 then writes the item number and the item name described in the order data, in the created record in the item table 431. Furthermore, the received order registration unit 421 writes designation of the option designated for the parts of the item by the customer, and the like, in the item definition table 432. In step S1200, the received order registration unit 421 determines whether or not the order is a reorder. The details of this flow will be described later.

In step S1300, the calibration implementation determination unit 422 determines whether or not to implement calibration for each part constituting the item registered in the database 430. The details of this flow will be described later.

In step S1400, the job generation unit 423 generates a job for each part constituting the item registered in the database 430. The details of this flow will be described later.

In step S1500, the job grouping unit 424 determines whether or not to group reorder jobs among jobs generated by the job generation unit 423, and if it is determined that grouping is performed, the job grouping unit 424 performs job grouping. The details of this flow will be described later.

In step S1600, the job transmission unit 425 transmits the job generated by job generation unit 423 to the image forming apparatus 500. Note that prior to the job transmission, the job transmission unit 425 transmits the target in accordance with whether or not to implement calibration for the job. In the present embodiment, in some cases, the target transmission and the job transmission are referred to also as first transmission and second transmission, respectively. Furthermore, in step S1600, the target obtainment unit 426 obtains the target from the image forming apparatus 500. The target storage unit 427 then stores the target obtained by the target obtainment unit 426 in association with the job transmitted by the job transmission unit 425, in the database 430. The details of this flow will be described later. The basic flow ends here.

Reorder Check Processing

FIG. 12 shows a detailed flow of step S1200 of determining whether or not the item in the order received by the workflow management software 420 is a reordered item. Steps S1201 to S1203 are executed for each order.

Initially, in step S1201, the received order registration unit 421 references the book number in the order data. In the exemplary order data shown in FIG. 9, the book number is an ID attribute value "98765432" in the item information 734. Next, the received order registration unit 421 references a BookID column in the item table 431 in the database 430, and determines whether or not the same number exists. If the same number exists, in step S1203 the received order registration unit 421 turns on the reorder flag in the item definition table 432 for each part of the item. If the same number does not exist, the processing ends. Note that in the present embodiment, the reorder is an order that is made by reusing the order information used when the previous order was made. Even if the content of an order is the same as the content of the previous order, a new ID is given in the case where new order information is created, and it is therefore not determined that the order is the reorder. For example, order history is stored in the order server 100, and if a new order is made using the history, this new order is regarded as the reorder. In other words, the reorder is an order that causes a job that has been executed for the previous order to be re-executed such that printing processing is performed again.

Processing in steps S1201 to S1203 is repeated for each item registered in the database 430 in step S1100.

The flow for determining whether or not the item in the order received by the workflow management software 420 is the reordered item ends here.

Flow for Determining Whether or not to Implement Calibration

Figure 13:
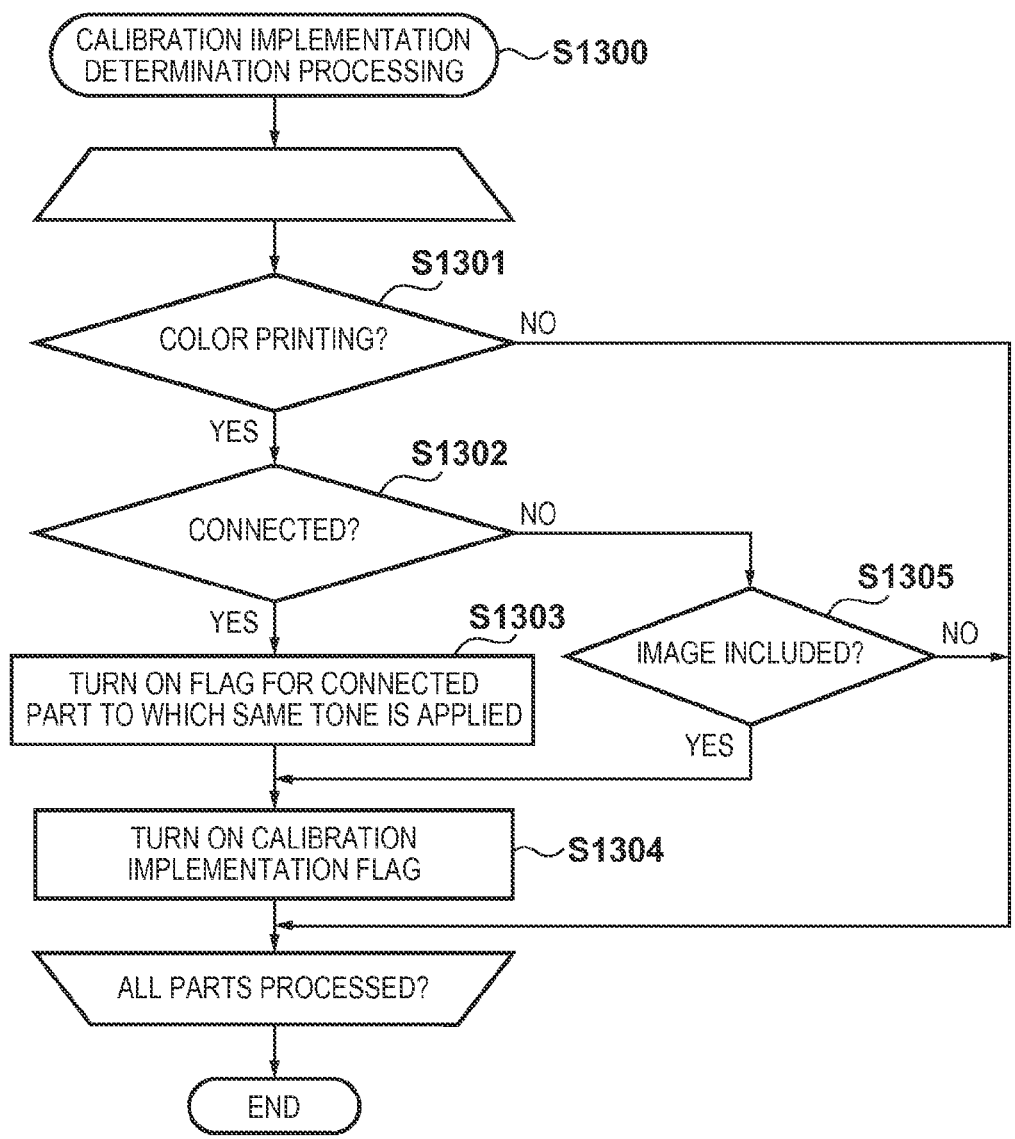
FIG. 13 is a diagram showing a flow of calibration implementation determination processing according to the present embodiment.

FIG. 13 shows a detailed flow of step S1300 of determining whether or not to implement calibration for each part constituting the item in the order received by the workflow management software 420. Steps S1301 to S1305 are executed for each part. Note that a part to be a processing object will be referred to as an object part.

Initially, in step S1301, the calibration implementation determination unit 422 references a color setting in the order data, and determines whether or not color printing is to be performed on the object part. In the exemplary order data shown in FIG. 9, tags 737 and 738 indicate color printing settings. In the case where ProcessColorModel="DeviceCMYK" as indicated by the tag 737, color printing is to be performed. In the case where ProcessColorModel="DeviceGray" as indicated by the tag 738, monochrome printing is to be performed. In the case of monochrome printing in step S1301, it is determined that calibration is not implemented. If an unprocessed part remains, the processing is performed from step S1301 while regarding this part as the object part, and if there is not any unprocessed part, the processing ends. In the case of color printing, the processing proceeds to step S1302.

In step S1302, the calibration implementation determination unit 422 determines whether or not the parts are connected with each other. The case where the parts are connected is, for example, the case where the cover and the wraparound band are connected and the same image is printed thereon, as shown in FIG. 2. In the exemplary order data shown in FIG. 9, the parts with the tag 736 that is set so as to designate "Dynamic" are connected with each other. That is to say, in the example in FIG. 9, the cover and the wraparound band are connected. For this determination, it is determined whether or not the option tag for the object part is set as "Dynamic". If there is not the "Dynamic" option tag, it is determined that the object part is not connected with the other parts. If the option tag is set as "Dynamic", parts with the "Dynamic" option tag other than the object part are searched for, and if there is a part with the "Dynamic" option tag, it can be determined that the object part is connected to this part.

If there is a part connected with the object part, i.e., if the option tag having the value "Dynamic" is included in two or more parts, the calibration implementation determination unit 422 proceeds to step S1303 and turns on the connection flags for the connected parts. Here, the connection flag for only the object part may be turned on, or the connection flags for all connected parts may be turned on. If there is a connected part, in step S1304 the calibration implementation determination unit 422 turns on the calibration implementation flag.

If there is not a part connected with the object part, the calibration implementation determination unit 422 proceeds to step S1305 and determines whether or not an image object is included in the content of the object part. If the image object is included, the calibration implementation determination unit 422 proceeds to step S1304 and turns on the calibration implementation flag. If an image object is not included, the processing ends. The calibration implementation determination flow for the object part ends here. If an unprocessed part remains, the processing is repeated from step S1301 while regarding this part as the object part.

Job Generation Flow

Figure 14:
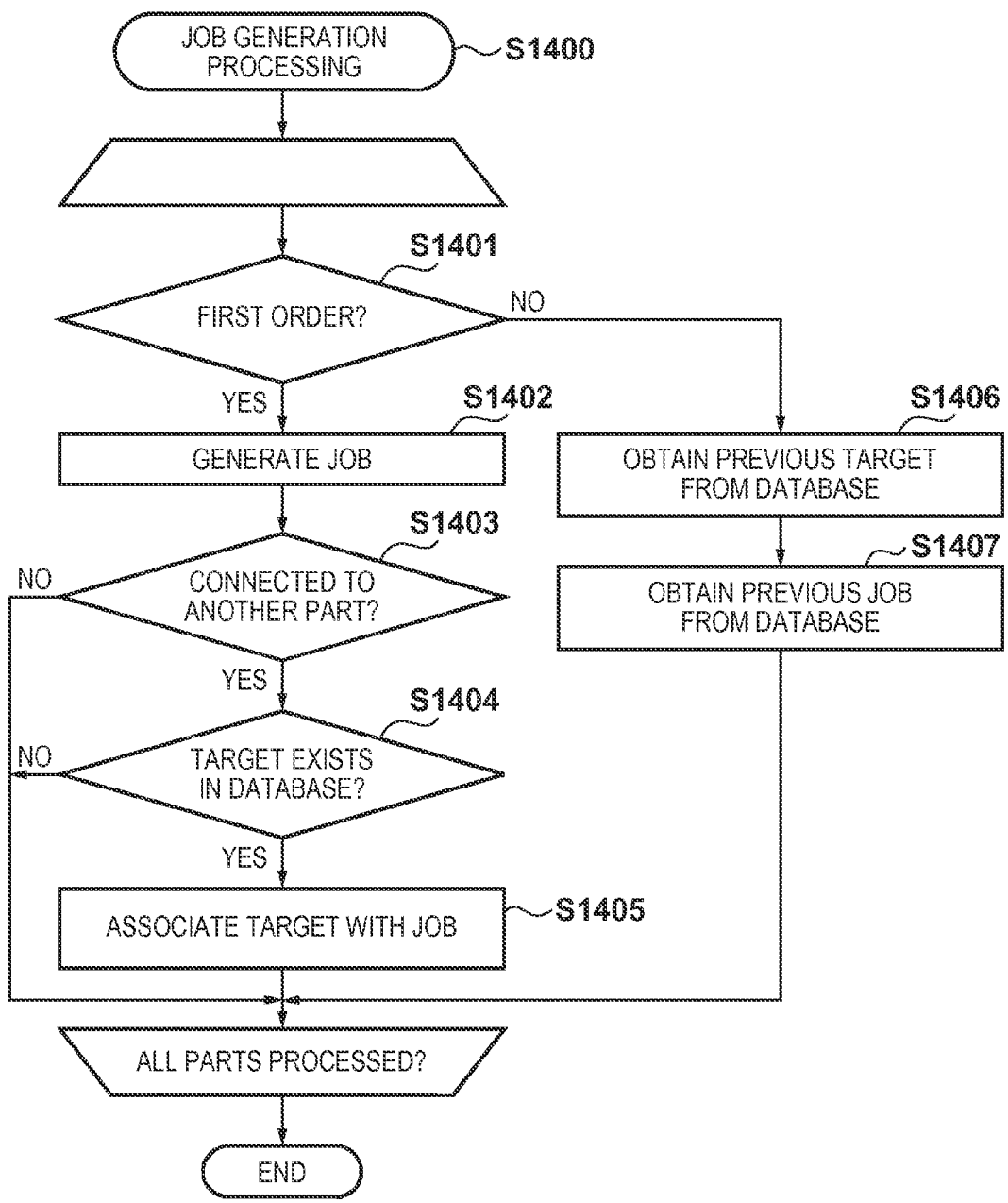
FIG. 14 is a diagram showing a flow of job generation processing according to the present embodiment.

FIG. 14 shows a detailed flow of step S1400 in which the workflow management software 420 generates a job for each part. Steps S1401 to S1407 are executed for each part. In the following description, a part to be a processing object will be referred to as an object part. In step S1401, the job generation unit 423 determines whether or not the object part is for a reorder. Specifically, the job generation unit 423 determines whether or not the reorder flag in the item definition table 432 in the database 430 is on. If the object part is for a first-time order, the job generation unit 423 proceeds to step S1402. If the object part is for a reorder, the job generation unit 423 proceeds to step S1406.

In the case of a first-time order, the job generation unit 423 proceeds to step S1402 and generates a job such as the job shown in FIG. 10. The generated job is stored in a memory, or the like. In step S1403, the job generation unit 423 references the connection flag for the object part in the database 430, and determines whether or not the object part is connected with the other parts. If the object part is not connected with any other parts, the processing ends. If the object part is connected with the other parts, the processing proceeds to step S1404. In step S1404, the job generation unit 423 references the target storage table 423 in the database 430, and determines whether or not the target connected with the object part and associated with an already generated job exists. For example, if the cover and the wraparound band are connected and printing of the job for the cover is performed first, the target of the cover has already been stored in the target storage table 423. When the job for the wraparound band is generated, the target associated with the job for the cover connected to the wraparound band already exists, and it is therefore determined that the target associated with the job for the object part exists. If the target exists, the processing proceeds to step S1405, and if the target does not exist, the processing for the object part ends. In step S1405, the job generation unit 423 associates the target existing in the database according to the determination in step S1404 with the job for the object part.

In the case of a reorder, in steps S1406 to S1407, the job generation unit 423 obtains the previous job and the target associated with the previous job from the database 430. The processing related to the job generation processing ends here.

Flow Related to Job Grouping

Figure 15:
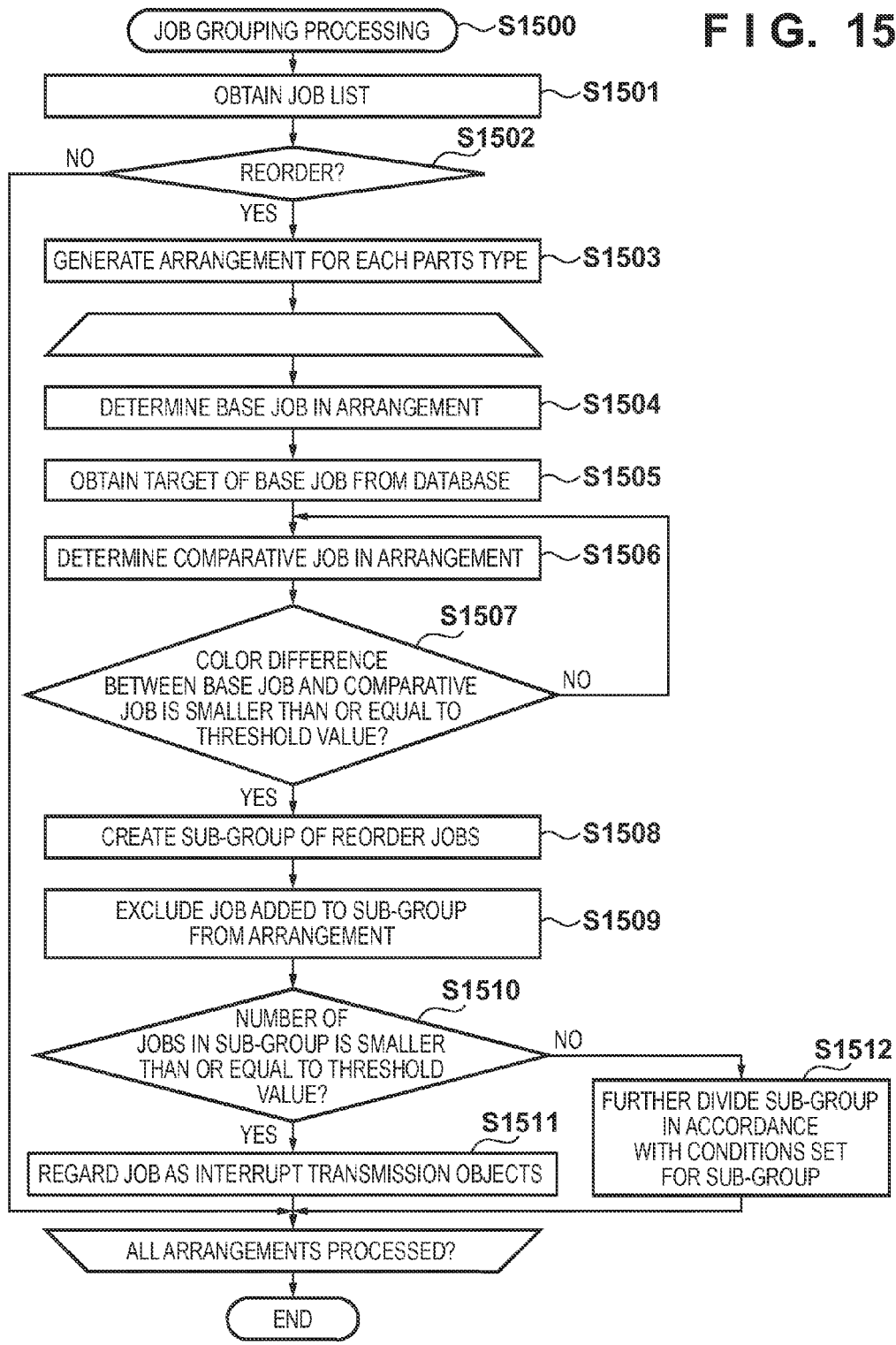
FIG. 15 is a diagram showing a flow of job grouping processing according to the present embodiment.

FIG. 15 shows a flow in which the workflow management software 420 groups reorder jobs. Initially, in step S1501, the job grouping unit 424 obtains a list of jobs generated by the job generation unit 423. In step S1502, the job grouping unit 424 determines whether or not each of the obtained jobs is a reorder by referencing the reorder flag. If the job is not a reorder, the processing ends. In the case of a reorder, in step S1503, the job grouping unit 424 creates an arrangement of jobs for each type of parts, such as the main text, the cover, and the wraparound band, based on the generated jobs. Thereafter, the processing is performed for each arrangement. The order of the jobs in each arrangement may be the order of execution, for example. After the arrangement is created, steps S1504 to S1512 are executed for each of the created arrangements. In the following description, the arrangement to be a processing object will be referred to as an object arrangement.

In step S1504, the job grouping unit 424 determines a base job in the object arrangement. In the present embodiment, the job at the top of the object arrangement is the base job.

In step S1505, the job grouping unit 424 obtains the target of the base job from the target storage table 433 in the database 430. In step S1506, the job grouping unit 424 obtains a job to be compared from the object arrangement. The job to be compared is a job other than the base job.

In step S1507, the job grouping unit 424 compares the target of the base job with the target of the job to be compared, and determines whether or not color difference therebetween is smaller than or equal to a threshold value. For example, if L*a*b* coordinates of the colors in the target of the base job and the target of the job to be compared are (40, 45, 3) and (43, 50, 5), respectively, the difference between the target of the base job and the target of the job to be compared is (3, 5, 2). The color difference is obtained based on (3, 5, 2). The color difference is represented by the distance in the L*,a*,b* space, for example. Assuming that the difference in L*,a*,b* components between two points are $\Delta L, \Delta a, \Delta b$, the distance is given as $\sqrt{(\Delta L^* \Delta L + \Delta a^* \Delta a + \Delta b^* \Delta b)}$. In the above example, the color difference is $\sqrt{(9+25+4)}$=approximately 6.2. This color difference is compared with a predetermined threshold value, e.g., 3.0. In the above example, it is determined that the color difference is larger than the threshold value. There are also other methods for representing the color difference, and these other methods may alternatively be employed. Note that since the target contains samples of a plurality of colors, the distance to be compared with the threshold value may be, for example, the largest value among values of the distances regarding these color samples, or may be an average value thereof.

If the color difference is larger than the threshold value, the processing proceeds to step S1506. If the color difference is smaller than or equal to the threshold value, the processing proceeds to step S1508. Note that in the procedure in FIG. 15, if there is one job to be compared whose color difference from the base job is smaller than or equal to the threshold value, a sub group is formed by these two jobs. Meanwhile, with another method, all combinations of jobs with the color difference therebetween in the target being smaller than or equal to the threshold value may be checked. In order to perform this check, for example, after one base job is determined, all jobs in the object arrangement other than the base job are regarded as the jobs to be compared, and it is determined whether or not the color difference in the target is smaller than or equal to the threshold value. The base job and the job to be compared having the color difference therebetween that is smaller than or equal to the threshold value according to this determination are marked as jobs with a small color difference regarding this base job. Furthermore, among the jobs in the arrangement, each of the jobs that have not yet been set as the base job is regarded as a new base job, and then the above procedure is repeated. However, in this case, the job that has already been regarded as the base job does not need to be set as the job to be compared. Thus, it is determined, regarding all combinations, whether the color difference in the target between the jobs in the arrangement is smaller than or equal to the threshold value.

After the jobs with the color difference therebetween in the target being smaller than or equal to the threshold value are thus determined, in step S1508 the job grouping unit 424 creates a sub-group of reorder jobs. The sub-group is a group of jobs with the color difference therebetween in the target being smaller than or equal to the threshold value, among the jobs in the object arrangement. Accordingly, the jobs with the color difference therebetween being smaller than or equal to the threshold according to the determination in step S1507 are the members of the sub-group. In the case of alternatively employing the procedure described above as the other method, jobs marked as having the color difference in the target from a certain base job that is smaller than or equal to the threshold value are members of the sub-group related to this base job. Regarding a job belonging to a plurality of sub-groups, if this job is a member serving as the job to be compared in all sub-groups, the job is deleted from a sub-group with a smaller number of members, for example. If this job is a member serving as the base job in any of the sub-groups, the job is left in the sub-group in which the job is a member serving as the base job, and is deleted from a sub-group in which the job is a member serving as the job to be compared. However, in the case where a plurality of sub-groups can be integrated, these sub-groups may be integrated. If there is a sub-group with only one member, the job of this member is excluded from the sub-group, and this sub-group is deleted. Then, in step S1509, the job added to the sub-group is excluded from the arrangement.

In step S1510, the job grouping unit 424 determines whether or not the number of jobs included in each sub-group created for the object arrangement is smaller than or equal to a threshold value. If the number of jobs is smaller than or equal to the threshold value, in step S1511 the job grouping unit 424 regards these jobs as interrupt transmission objects. The jobs regarded as the interrupt transmission objects are marked. If the number of jobs is larger than the threshold value, in step S1512 the job grouping unit 424 further divides the sub-group in accordance with a predetermined condition (one of, or a combination of, the number of jobs, the number of pages, and the number of copies). That is to say, the sub-group is divided into a plurality of sub-groups that satisfy the condition in step S1510. The flow for grouping the reorder jobs ends here. Jobs belonging to a sub-group are displayed by associating job identifiers with a sub-group identifier, or the like, for example.

Flowchart for Issuing Job

FIG. 16 shows a flow in which the workflow management software 420 transmits a job to the image forming apparatus 500. Steps S1601 to S1617 in FIG. 16 are executed for each job. In the following description, the job to be a processing object will be referred to as an object job.

Initially, in step S1601, the job transmission unit 425 references the reorder flag column in the item definition table 432 in the database 430, and determines whether or not the object job is a first-time order. In the case of a first-time order, the processing proceeds to step S1602. In the case of a reorder, the processing proceeds to step S1610.

In the case of a first-time order, in step S1602, the job transmission unit 425 references the connection flag for the object job in the item definition table 432 in the database 430, and determines whether or not the connection flag is on. That is to say, the job transmission unit 425 determines whether or not the object job is a job for a part connected to the other parts. If so, the processing proceeds to step S1603, and the job transmission unit 425 transmits the target of the connected part to the image forming apparatus 500. If not, the processing proceeds to step S1604. Note that after the target is transmitted to the image forming apparatus 500, calibration using this target is performed prior to subsequent print jobs, and a new calibration table is created and is applied to the subsequence print jobs.

In step S1604, the job transmission unit 425 transmits the object job to the image forming apparatus 500. The image forming apparatus 500 executes the object job and creates the target after printing for this job ends. In step S1605, the target obtainment unit 426 obtains the target transmitted from the image forming apparatus 500. In step S1606, the target storage unit 427 stores the target obtained by the target obtainment unit 426 and the object job transmitted by the job transmission unit 425 in association with each other, in the job column in the item definition table 432 and the target storage table 433 in the database 430. Specifically, in the exemplary print job 800 (FIG. 10), this association is performed by writing, in the association section 801, information of association between the object job and the target.

In step S1607, the job transmission unit 425 determines whether or not there is a job that is the interrupt transmission object according to the determination in step S1511 and has not yet been executed. In step S1608, the job transmission unit 425 compares the target of the object job with the target of the interrupt transmission object job among the reorder jobs to check the color difference therebetween, and if the color difference is small, in S1609 the job transmission unit 425 transmits the interrupt transmission object job to the image forming apparatus 500. The job that is once transmitted to the image forming apparatus becomes a processed job.

In the case of a reorder, in step S1610 the job transmission unit 425 references the calibration implementation flag in the item definition table 432 in the database 430, and determines whether or not to implement calibration. In the case of not implementing calibration, in step S1618 the job transmission unit 425 transmits the object job to the image forming apparatus 500, and advances the processing to the next job. In the case of implementing calibration, in step S1611 the job transmission unit 425 determines whether or not the object job belongs to a reorder sub-group.

Here, if it is determined that calibration is implemented, this may be displayed on a UI to prompt a user to implement calibration.

If the object job does not belong to the sub-group, in step S1616 the job transmission unit 425 transmits only one target, namely the target of the object job, to the image forming apparatus 500. In step S1617, the job transmission unit 425 transmits this job to the image forming apparatus 500.

If the object job belongs to the sub-group, in step S1612 the job transmission unit 425 compares the targets in reorder sub-groups with each other to check the color difference therebetween, and determines whether or not the color difference is within an allowable range. Note that if integration of sub-groups has been done during the sub-grouping processing, step S1612 can be skipped. If the color difference is within the allowable range, in step S1613 the job transmission unit 425 groups the sub-groups having the color difference within the allowable range into the same group. If the color difference is out of the allowable range, the processing proceeds to step S1614. Determination of the comparison regarding the color difference in the target between the sub-groups can be performed by using, as the comparison object, the largest of the color differences between members in each sub-group, for example.

In step S1614, the job transmission unit 425 transmits only one target, namely the target of the job serving as a representative member of the sub-group, to the image forming apparatus 500. In step S1615, the job transmission unit 425 transmits all jobs belonging to the sub-group to the image forming apparatus 500. The processing related to job issuing ends here.

As described above, according to the present embodiment, the number of times to implement calibration is reduced in the case where a plurality of parts constitute a single item and the same tone needs to be applied to parts thereof such as a cover and a wraparound band, and accordingly the time and effort that bother an operator can be reduced. Furthermore, since the number of times to implement calibration is reduced, the time taken to obtain a printing result can be shortened.

Moreover, according to the present embodiment, in the case of a reorder as well, the number of times of calibration can be reduced, and the time and effort that bother an operator can be reduced. Furthermore, since the number of times to implement calibration is reduced, the time taken to obtain a printing result can be shortened.

Note that the target to be initially associated with a certain job may be a target that has already been stored in the image forming apparatus 500 when the job is transmitted, as indicated by steps S1602 to S1604 in FIG. 16, but alternatively, a target created using a desired image forming apparatus, such as a standard apparatus, may be associated with the job in advance, and this target may be transmitted prior to the job transmission processing in FIG. 16.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126131, filed Jun. 14, 2013 which is hereby incorporated by reference herein in its entirety.

What is claimed is:

1. An information processing apparatus for causing an image forming apparatus to perform printing, the image forming apparatus performing calibration in order to correct an output color to a target color indicated by target information when receiving the target information, the information processing apparatus comprising:
a storing unit configured to, when printing processing is executed for a print job which has not been executed by the image forming apparatus, stores the target information in association with the print job;
a grouping unit configured, when printing processing is executed for the print jobs which has been executed by the image forming apparatus, to read the print jobs stored by the storing unit and to make a group of the print jobs associated with target information, wherein a color difference between target colors indicated by target information associated with a base print job selected from the group and each print job in the group is smaller than or equal to a predetermined value, and
a transmitting unit configured to transmit the target information associated with the base print job to trigger the calibration in the image forming apparatus and the group of the print jobs made by the grouping unit,
wherein after transmitting, to the image forming apparatus by the transmission unit, a print job which has not been executed by the image forming apparatus, if there is the group associated with the target information with a color difference that is smaller than or equal to the predetermined value from the target information associated with the print job which has not been executed, the transmission unit transmits the group of the print job to the image forming apparatus together with the print job which has not been executed.

2. The information processing apparatus according to claim 1,
wherein if printing processing has been executed for the print job by the image forming apparatus, display is performed in order to prompt a user to execute calibration based on the target information associated with the print job.

3. The information processing apparatus according to claim 1, further comprising:
a determination unit configured determine, based on an ID of order information, whether or not the print job to be executed by the image forming apparatus has been executed.

4. The information processing apparatus according to claim 1,
wherein the grouping unit divides the group if the number of members of the group exceeds a threshold value.

5. The information processing apparatus according to claim 3, further comprising
a job generation unit configured to, if the determination unit determines that the print job has not been executed, generate a print job in accordance with the order information, and, if a part constituting the generated print job is defined as containing the same image as an image contained a part constituting another print job and the target information associated with the other print job is stored by the storing unit, associate the target information with the generated print job, and if the determination unit determines that the print job to be executed has been executed, read out the print job and the target information associated with the print job stored by the storing unit.

6. An information processing method to be performed by an information processing apparatus for causing an image forming apparatus to perform printing, the image forming apparatus being able to perform calibration in order to correct an output color to a target color indicated by target information when receiving the target information, the method comprising:
when printing processing is executed for a print job which has not been executed by the image forming apparatus, storing the target information in association with the print job;
when printing processing is executed for the print jobs which has been executed by the image forming apparatus, reading the print jobs stored in the storing and making a group of the print jobs associated with target information, wherein a color difference between target colors indicated by target information associated with a base print job selected from the group and each print job in the group is smaller than or equal to a predetermined value, and
transmitting the target information associated with the base print job to trigger the calibration in the image forming apparatus and the group of the print jobs made in the grouping,
wherein after transmitting, to the image forming apparatus in the transmitting, a print job which has not been executed by the image forming apparatus, if there is the group associated with the target information with a color difference that is smaller than or equal to the predetermined value from the target information associated with the print job which has not been executed, the group of the print job is transmitted in the transmitting to the image forming apparatus together with the print job which has not been executed.

7. A non-transitory computer-readable medium storing a program for causing a computer to execute a procedure, the computer causes an image forming apparatus to perform printing, the image forming apparatus performing calibration in order to correct an output color to a target color indicated by target information when receiving the target information, the procedure comprising:
when printing processing is executed for a print job which has not been executed by the image forming apparatus, storing the target information in association with the print job;
when printing processing is executed for the print jobs which has been executed by the image forming apparatus, reading the print jobs stored in the storing and making a group of the print jobs associated with target information, wherein a color difference between target colors indicated by target information associated with a base print job selected from the group and each print job in the group is smaller than or equal to a predetermined value, and
transmitting the target information associated with the base print job to trigger the calibration in the image forming apparatus and the group of the print jobs made in the grouping,
wherein after transmitting, to the image forming apparatus in the transmitting, a print job which has not been executed by the image forming apparatus, if there is the group associated with the target information with a color difference that is smaller than or equal to the predetermined value from the target information associated with the print job which has not been executed, the group of the print job is transmitted in the transmitting to the image forming apparatus together with the print job which has not been executed.

8. An image forming system comprising:
an information processing apparatus for causing an image forming apparatus to perform printing, the image forming apparatus performing calibration in order to correct an output color to a target color indicated by target information when receiving the target information, the information processing apparatus comprising:
a storing unit configured to, when printing processing is executed for a print job which has not been executed by the image forming apparatus, stores the target information in association with the print job;
a grouping unit configured, when printing processing is executed for the print jobs which has been executed by the image forming apparatus, to read the print jobs stored by the storing unit and to make a group of the print jobs associated with target information, wherein a color difference between target colors indicated by target information associated with a base print job selected from the group and each print job in the group is smaller than or equal to a predetermined value, and
a transmitting unit configured to transmit the target information associated with the base print job to trigger the calibration in the image forming apparatus and the group of the print jobs made by the grouping unit; and
an image forming apparatus that can perform calibration using the target information,
wherein after transmitting, to the image forming apparatus by the transmission unit, a print job which has not been executed by the image forming apparatus, if there is the group associated with the target information with a color difference that is smaller than or equal to the predetermined value from the target information associated with the print job which has not been executed, the transmission unit transmits the group of the print job to the image forming apparatus together with the print job which has not been executed.

\* \* \* \* \*